United States Patent
Hanks et al.

(10) Patent No.: US 10,198,948 B2
(45) Date of Patent: Feb. 5, 2019

(54) LOW POWER SENSOR SYSTEM

(71) Applicant: Trail Ridge Technologies, LLC, Fort Collins, CO (US)

(72) Inventors: D. Mitchel Hanks, Fort Collins, CO (US); Robert A. Morain, Fort Collins, CO (US)

(73) Assignee: Trail Ridge Technologies, LLC, Fort Collins, CO (US)

( * ) Notice: Subject to any disclaimer, the term of this patent is extended or adjusted under 35 U.S.C. 154(b) by 0 days.

(21) Appl. No.: 15/796,638

(22) Filed: Oct. 27, 2017

(65) Prior Publication Data
US 2018/0122235 A1    May 3, 2018

Related U.S. Application Data

(60) Provisional application No. 62/414,093, filed on Oct. 28, 2016.

(51) Int. Cl.
*H04W 4/38* (2018.01)
*G08G 1/0967* (2006.01)
(Continued)

(52) U.S. Cl.
CPC ........ *G08G 1/096775* (2013.01); *G01S 7/003* (2013.01); *G01S 7/022* (2013.01);
(Continued)

(58) Field of Classification Search
CPC ................ B60Q 1/143; B60Q 2300/41; B60Q 2300/42; B60Q 1/04; B60Q 1/1423;
(Continued)

(56) References Cited

U.S. PATENT DOCUMENTS

| | | | |
|---|---|---|---|
| 6,098,118 A | 8/2000 | Ellenby et al. | |
| 6,505,947 B1* | 1/2003 | Brinkmann | B60Q 1/085 362/276 |

(Continued)

OTHER PUBLICATIONS

Maheswar et al., "A Survey on Duty Cycling Schemes for Wireless Sensor Networks", IRACST—International Journal of Computer Networks and Wireless Communications (IJCNWC), vol. 3, No. 1, Feb. 2013.

(Continued)

*Primary Examiner* — Emily C Terrell
(74) *Attorney, Agent, or Firm* — Santangelo Law Offices, P.C.

(57) ABSTRACT

A low power sensor system and protocol are provided. Particular embodiments of the invention include a sensor controlled switch that senses conditions. While the sensor controlled switch is sensing conditions and the switch that it controls is open, power is conserved. When a valid condition is sensed, the switch is closed which enables a sensor system to receive power. The powered sensor system can then perform tasks such as listen for radio transmissions from a human interface device and respond to these. In another embodiment of the invention a delayed shutdown is executed, wherein the sensor system is put in a low power state for a period of time before responding to further conditions sensed by the sensor controlled switch. An example application is in a battery powered vehicle camera system.

20 Claims, 11 Drawing Sheets

(51) Int. Cl.
*H04N 7/18* (2006.01)
*H04N 5/232* (2006.01)
*H04W 4/04* (2009.01)
*G01S 7/00* (2006.01)
*G08G 1/01* (2006.01)
*G01S 7/02* (2006.01)
*H04W 4/80* (2018.01)
*H04W 4/48* (2018.01)

(52) U.S. Cl.
CPC ......... *G08G 1/0112* (2013.01); *G08G 1/0133* (2013.01); *H04N 5/23206* (2013.01); *H04N 7/185* (2013.01); *H04W 4/046* (2013.01); *H04W 4/38* (2018.02); *H04W 4/48* (2018.02); *H04W 4/80* (2018.02); *B60R 2300/302* (2013.01); *H04N 7/183* (2013.01)

(58) Field of Classification Search
CPC .......... B60Q 2300/052; B60Q 2300/21; B60Q 2300/312; B60Q 2300/314; B60Q 2300/3321; B60Q 2300/43; B60Q 2400/30; B60R 11/04; B60R 1/00; B60R 1/04; B60R 1/088; B60R 1/12; B60R 2001/10; B60R 21/01538; B60R 2300/103; B60R 2300/30; B60R 2300/8026; B60R 2300/8046; B60R 2300/8066; B60R 2300/8073; B60R 2300/8093; B60R 2021/0069; B60R 21/013; B60R 21/0134; B60R 25/1004; B60R 25/305; G06T 2207/30252
See application file for complete search history.

(56) References Cited

U.S. PATENT DOCUMENTS

| | | |
|---|---|---|
| 6,600,415 B1* | 7/2003 | Li .................. G01P 15/135 340/463 |
| 7,420,149 B2 | 9/2008 | Goldberg et al. |
| 7,507,946 B2 | 3/2009 | Goldberg et al. |
| 9,656,621 B2* | 5/2017 | Curtis ................ B60R 16/033 |
| 2003/0141965 A1* | 7/2003 | Gunderson .......... B60R 21/013 340/431 |
| 2010/0100306 A1* | 4/2010 | Gamache ............ F02N 11/0803 701/113 |

OTHER PUBLICATIONS

Polastre et al., "Versatile Low Power Media for Wireless Sensor Networks", SenSys '04 Proceedings of the 2nd International Conference on Embedded Networked Sensor Systems, pp. 95-107, Nov. 3-5, 2004, Baltimore, Maryland, USA.

Gu, Lin and John A. Stankovic, "Radio-Triggered Wake-Up for Wireless Sensor Networks", Journal of Real-Time Systems vol. 29 Issue 2-3, Mar. 2005.

Bdiri, Sadok and Faouzi Derbel, "An Ultra-Low Power Wake-Up Receiver for Real-time constrained Wireless Sensor Networks", AMA Conferences 2015, Proceedings SENSOR 2015 pp. 612-617, May 2015.

U.S. Appl. No. 62/414,093, filed Oct. 28, 2016. First Named Inventor: Hanks.

* cited by examiner

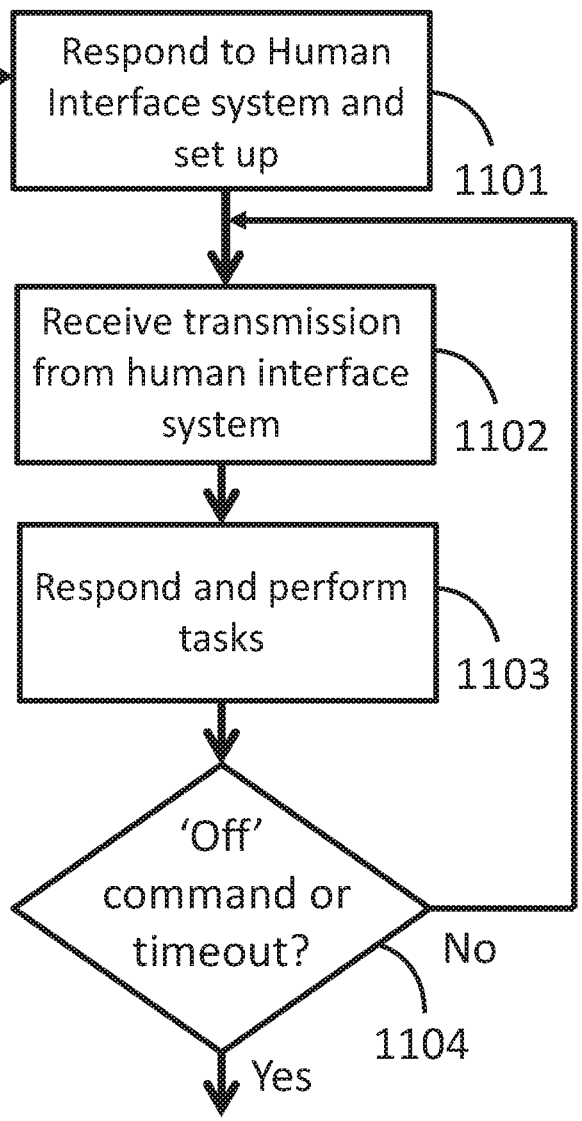

LOW POWER SENSOR SYSTEM

CROSS REFERENCE TO RELATED APPLICATIONS

This is a U.S. non-provisional patent application that claims priority to and the benefit of provisional application No. 62/414,093 filed Oct. 28, 2016, said provisional application incorporated herein, by reference, in its entirety.

BACKGROUND OF THE INVENTION

In recent years an increasing number of new cars are being sold with built-in rear view cameras. Lawmakers have called for all new vehicles to be sold with rear view cameras built in. The interest in rear view cameras arises from the danger that a driver, when backing a vehicle, may not see all that is behind the vehicle. Indeed, each year there are several fatalities brought about when a vehicle backs over an individual that was not seen by the driver. Additionally, damage is done to property and vehicles behind a driver when the driver backs up without seeing an obstacle behind them.

Typically there are several blind zones around a vehicle. For example, in most vehicles the driver cannot see what is below the rear view window and immediately behind the vehicle. If the driver backs up without having first walked behind the vehicle and checked what is back there the possibility exists that a person or object of value will be injured or damaged.

In order to assist the driver, rear view cameras are now installed in many new vehicles. These cameras give the driver a view of what is behind the vehicle at the time they begin backing up so that they will see anything that is in the path of the vehicle and be able to stop before something is damaged. However, there are millions of older vehicles and still some new vehicles that will be driven but which will have no such driver assisting camera.

User installable rear view cameras can be purchased online or through retail outlets. Typically these camera systems will include a camera and a monitor. The camera is installed in the user's bumper by drilling a hole in the bumper and then feeding a power wire inside the vehicle and connecting to the vehicle's reverse light wiring. The monitor is attached to the dash and connected to a power source such as the vehicle's power port. A video cable from the camera is connected to the video input of the monitor.

In order to install such a camera the user must follow a number of difficult steps which include risks of damaging their vehicle or even possibly voiding certain vehicle warranties. In order to overcome some of these difficulties and dangers, some cameras can be attached to the vehicle's license plate, avoiding the need to drill a hole in the bumper. For these cameras, a small hole may still have to be drilled in the car's body somewhere which will allow passage of the power cable. The cable must then be connected to the car's electrical system by splicing into the reverse light wiring or otherwise electrically connecting the camera's power wiring to the car's power wiring.

In many vehicle cameras a wire connects the video output signal of the camera to the video input port of a monitor. This approach provides a high quality delivery of video to the monitor. However, it requires routing of the video cable from the camera, which is typically on the outside and at the rear of the vehicle, to the monitor, which is inside and in front of the driver area. In order to hide the cable from view or at least keep it from being snagged or pulled by movements inside the car, it is common to route the cable beneath the vehicle's carpet and upholstery and feed it through other areas where it will be secure and out of sight. This is a difficult and time consuming task. It can be avoided, however, through the use of wireless transmission to deliver the video signal from the camera to the monitor. If the video signal is transmitted wirelessly by radio to the monitor, there is no need to route a video cable through the vehicle, though most often a power cable must be routed into the vehicle and attached to a radio transmitter that must also be connected to the vehicle's electrical system.

Backup cameras are most useful when a vehicle is backing up. For this reason, a backup camera is configured to be activated when the vehicle is in reverse. After-market backup cameras are typically powered by connecting to the vehicles reverse light wiring. Thus, when the vehicle is in reverse, and the reverse lights come on, power is delivered to the camera and it begins to transmit video data to a connected human interface device which is typically a monitor. Unfortunately, it is difficult for a typical user to make this connection to the reverse light wiring. It is difficult to determine which wires to connect to and what polarity to connect to them with, and to splice into these wires in a neat fashion without damaging the wiring.

In order to avoid the need to connect a power cable from the camera to the vehicle, it is of interest to use batteries to power the camera. Battery powered cameras are widely used in other applications and have been for decades. In order to conserve battery power, low power components, techniques and protocols are employed in the design. With no connection to the reverse light wiring, a battery powered camera would have the limitation of not being turned on automatically when the vehicle is in reverse. This is a limitation that would need to be overcome if a battery powered camera is to be useful.

In a battery powered camera system it is common to find a user operated switch that will turn the camera on or off so that it is only on when in use. By keeping it off when not in use, battery power is conserved. In some systems a user operated switch turns the camera on and off. When the user wants to use the camera, they must turn the switch on, and then when they have finished using the camera, they must turn the switch off in order to conserve battery power.

Some vehicle cameras use such a user-operated switch. The camera, for example, may be kept in a storage compartment until needed at which time the user takes the camera from the storage compartment, mounts it in a position where it is useful (such as pointing at the ball of a trailer hitch-and-ball system) and then turns on the switch. The camera can then deliver image data to a monitor. When the task has been completed, the user can then turn the camera off and return the camera to storage. A disadvantage of this approach is that the user must perform the multiple steps of removing from storage, mounting, switching on, returning to the driver's seat to operate the vehicle, then switching off, unmounting, and returning the camera to storage. If the user forgets to turn the camera on there will be the need for the driver to go back to the camera, switch it on, and return the driver's seat. If the user forgets to shut it off when storing it, the camera's batteries will run down.

In order to maximize the benefits of a battery powered camera for a vehicle, it would be desirable to have the batteries last long enough so that the camera can be mounted and left in place for many months of use. Then on the rare occasions when the batteries have run down and need to be recharged or replaced, the camera can be temporarily unmounted for battery replacement, or connected to a power source for battery charging.

Accordingly, there is a need to minimize battery power consumption in the camera.

There is also a need to design a camera that is easy to install and doesn't require drilling holes or routing wires.

There is also a need to activate the camera when the vehicle is in reverse or when the driver otherwise needs the camera.

A well-known technique for conserving power in battery powered sensors is often called Duty Cycling. A survey of different types of Duty Cycling systems is found in [Maheswar et al., "A Survey on Duty Cycling Schemes for Wireless Sensor Networks", IRACST—International Journal of Computer Networks and Wireless Communications (IJCNWC) Vol. 3, No 1. February 2013; incorporated herein]. In this technique a radio is mostly in a low power state where it can neither transmit nor receive. Periodically, however, the radio is turned on briefly to listen for a transmitted signal or to transmit a signal and listen for a response. A timer is used to determine the period of the listen cycle. Duty Cycling is widely used in wireless sensor networks. An example of an application of duty cycling is in [Polastre et al., "Versatile Low Power Media for Wireless Sensor Networks", SenSys '04 Proceedings of the 2nd International Conference on Embedded Networked Sensor Systems, pp. 95-107, Nov. 3-5, 2004, Baltimore, Md. USA; incorporated herein].

A disadvantage of duty cycling is that parts of the system such as the radio are periodically brought to a fully 'on' state so that the radio can listen. Although the 'on' time of the duty cycle can be much shorter relative to the 'off' time, power consumption during the 'on' time accumulates over time toward discharging the battery. Still, because that consumption rate is much less than if the radio were on always, duty cycling is a useful approach in some applications to conserving battery power.

A second disadvantage of duty cycling is that the radio can only respond to transmissions during the time when it is on. Therefore, most of the time there is a delay that occurs between the time that a base station starts transmitting to a duty cycled radio and when the radio reaches the 'on' portion of the duty cycle and turns on to receive and respond to such transmissions.

U.S. Pat. Nos. 7,507,946 and 7,420,149 refer to a network sensor system wherein multiple wireless battery powered cameras are accessed by a hub that is connected to the Internet. In each camera, power is provided by a battery. In order to conserve battery power, duty cycling is used. In this specific implementation of duty cycling, a processor and radio are kept in a low power 'sleep' state. The processor can, however, still respond to processor interrupt requests (IRQs). These interrupts can come from internal timers and other internal functions or from external signals connected to the processor's interrupt request lines. Because the processor's interrupt handling capability is still functional, it can recognize which of several possible sources the interrupt came from and begin executing an interrupt subroutine customized for that specific interrupting source. The interrupt hardware can advantageously recognize the source of the interrupt and cause the processor to change its program counter such that it diverts its execution to an interrupt subroutine.

U.S. Pat. Nos. 7,507,946 and 7,420,149 also describe the use of a timer that activates a radio from time to time in a duty cycling scheme designed to reduce power consumption in a network imager. The low power timer runs continuously between cycles where the radio and other circuitry are briefly activated. U.S. Pat. Nos. 7,507,946 and 7,420,149 call for the timer to interrupt the microprocessor, which means interrupt responsive circuitry must consume enough power to remain active during the low power portion of the duty cycle. Because microprocessors typically come equipped with low power timers, this can be implemented without adding an additional timer.

A disadvantage of this approach is that because the timer and the part of the processor handling interrupts must be powered on, the processor is not completely off and will continue to consume power, albeit at a much lower level than when the processor is executing instructions. A second disadvantage is, as discussed above, that there will often be a delay between the time that a base station starts transmitting and when the network sensor system turns on, receives the transmission, and responds.

In summary, U.S. Pat. Nos. 7,420,149 and 7,507,946 teach of a viable way to conserve power in a home surveillance system. However, they consume power to operate a timer and interrupt handling capability and to periodically activate a radio to listen as part of a duty cycled scheme. They also incur a delay in response time as a base station must wait until the next 'on' cycle of the duty cycled radio before it will be able to receive a transmission and respond.

U.S. Pat. No. 9,656,621 teaches a system and method for sensor module power management powered by a solar energy harvester. They describe the use of a sensor to detect conditions when it may be desirable to turn on a vehicle sensor system radio to receive commands from a user device. Their system is brought to a mid power level to receive commands from the user device which would then bring operation to a high power level which could include transmission of sensor data at a high transmission rate. At a point when it is determined that the high power operation level is no longer necessary, the system changes to a low power level of operation, where a low power radio continues to receive commands from a user module, but in a manner that consumes minimal power. However, this low power state still must support the powering of at least a low performance radio, and therefore consumes power that causes the solar charged battery to deplete faster than desired.

The above difficulties and risks identify the need for a remote sensor system such as would be used in a vehicle imaging system that consumes virtually no power and responds without delay.

BRIEF SUMMARY OF THE INVENTION

An object of the inventive technology described herein is to minimize power consumption in a sensor system.

The following presents a simplified summary in order to provide a basic understanding of one or more aspects of the inventive technology. This summary is not an extensive overview of the inventive technology, and is neither intended to identify key or critical elements of the inventive technology, nor to delineate the scope thereof. Rather, the primary purpose of the summary is to present some concepts of the inventive technology in a simplified form as a prelude to the more detailed description that is presented later. The present inventive technology is directed to a system and method of controlling power consumption in a sensor system.

In accordance with at least one embodiment of the invention, an apparatus for sensing conditions with a sensor-controlled switch and controlling power consumption is disclosed. The sensor-controlled switch may be configured to be responsive to conditions when in an open position and to be unresponsive to conditions when in a closed position. Further, the sensor-controlled switch may be coupled to a power source and when closed allow power to flow to a device such as a processor and possibly other circuitry. The apparatus may include a surroundings sensor to provide surroundings data such as but not limited to image data. A radio may be configured by the processor to listen for a transmission and/or to transmit surroundings data. A human interface device may be configured to communicate with the radio and to receive surroundings data.

In accordance with at least one embodiment of the invention, a method for controlling power consumption is disclosed. A sensor-controlled switch may sense a condition that causes the switch to be closed. Once closed, a processor may receive power and perform a task such as transmit surroundings data or receive a transmission from a human interface device. A low power state may then be entered during which the switch may be unresponsive. Finally, after a period of time the switch may be opened.

In accordance with at least one embodiment of the invention, a sensor system may receive a transmission from a human interface device as a result of an action taken by a driver. For example, a driver may start a vehicle. Or, a driver may touch a switch, pushbutton, touch screen, or activator. Each may result in a sensor system receiving a transmission. As the sensor system and human interface device communicate, surroundings data such as video data may be requested by the human interface device and sent by the sensor system. The human interface device may include a display on which the video could be displayed.

BRIEF DESCRIPTION OF THE DRAWINGS

FIG. 11 shows another part of a flow diagram for a low power sensor system.

DETAILED DESCRIPTION OF THE PREFERRED INVENTIVE TECHNOLOGY

Figure 1:
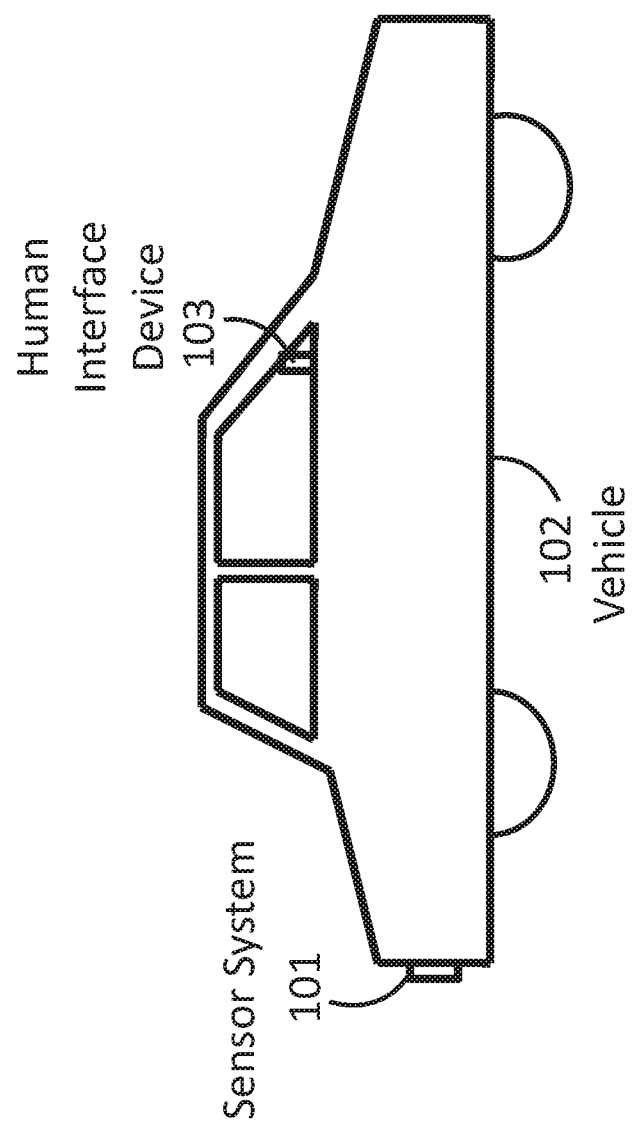
FIG. 1 shows a vehicle sensor system and human interface device on a vehicle.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments are not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Although the following embodiments describe attachment to and use with a vehicle, it will be understood that embodiments of the inventive technology are not limited to use with a vehicle. For example, the inventive technology would be useful in an application where a garden sensor system is normally off except when it is sensed that there has been a change in temperature or humidity, at which time it would turn on a radio allowing a sprinkler control device to request and obtain more detailed soil moisture level information from the sensor system. In another example, the inventive technology would be useful in a water quality monitoring application. When a sensor detects a change in chemical composition it could activate the sensor radio so that it could communicate with a base station to share more information. Obviously, the inventive technology would be useful in a variety of remote imaging application, where the remote imager is normally off until an event of interest is sensed, at which time the remote imager turns on and allows a base station to communicate with it to receive image data relating to the event.

FIG. 1 illustrates a first embodiment of the inventive technology as installed in a vehicle. In this embodiment, sensor system 101 is mounted on vehicle 102. Sensor system 101 houses the sensors, electronics, radio, power source and other circuitry to sense conditions, sense surroundings, and communicate wirelessly with human interface device 103. Human interface device 103 is mounted in the driver area within view of the driver and contains electronics, radio, and user interface to communicate wirelessly with sensor system 101 in order to process and to present sensor data to a driver in useful form. Human interface device 103 is usually installed in an area where an external power source is available. In the foregoing embodiment, for example, human interface device 103 is connected to the vehicle's power port to receive power. Sensor system 101 contains its own power source and therefore does not receive power from the vehicle's power system.

Figure 2:
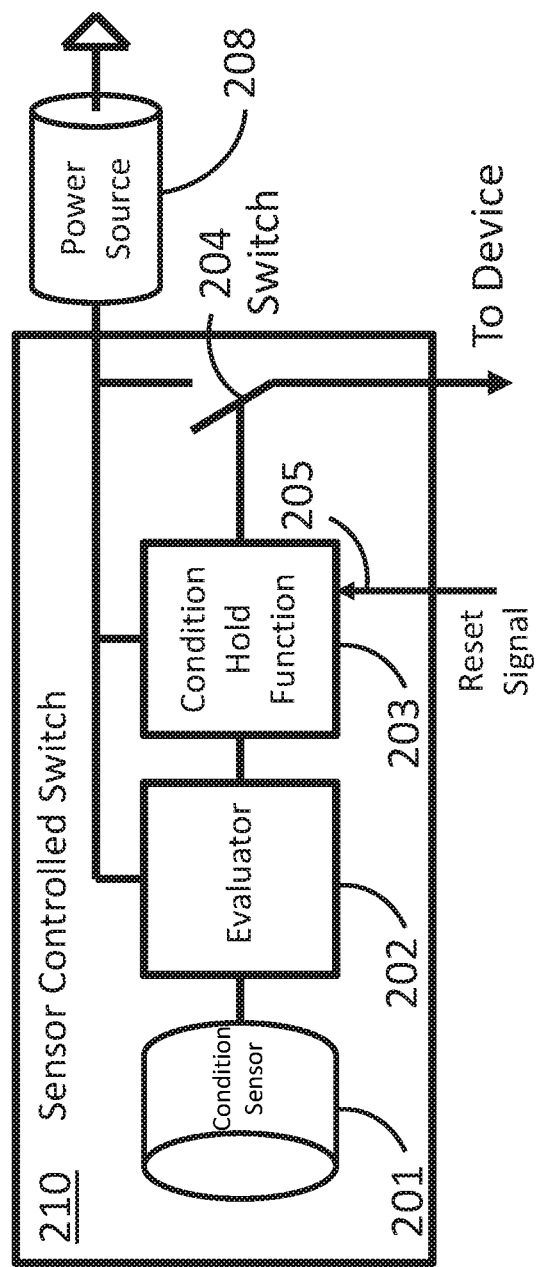
FIG. 2 shows a sensor-controlled switch.

Referring now to FIG. 2, sensor-controlled switch 210 is described. Sensor-controlled switch 210 is a part of sensor system 101, the rest of which will be detailed below. Condition sensor 201 monitors physical conditions such as shock and vibration, sound wave patterns, electromagnetic wave activity, pressure, temperature, and/or proximity to objects and so forth, as but a few examples. Coupled to condition sensor 201 is an evaluator 202. Evaluator 202 compares electrical activity and/or patterns coming from condition sensor 201 to determine whether it meets certain criteria designed to recognize valid conditions. A valid condition is a condition that meets evaluator 202's criteria and sets condition hold function 203.

To aid in understanding the foregoing, consider an accelerometer as condition sensor 201. In this example, a voltage comparator would be useful for evaluator 202, and a set/reset flip flop could serve as condition hold function 203. If a shock sufficient to cause the output of the accelerometer to exceed the voltage reference of the accelerometer occurs, the output of the comparator would switch high, signaling that a valid condition (that the accelerometer output was of amplitude greater than the reference voltage) has occurred. Because the accelerometer output is transient, the comparator output will only be high momentarily (while the accelerometer output is higher than the comparator voltage). However, the set/reset flip flop will be set by the high level of the comparator output, and will remain set as a result of the comparator output going high. This 'holds' the valid condition that the accelerometer exceeded the comparator voltage reference level.

Condition hold function 203 is coupled to switch 204. When condition hold function 203 is set by evaluator 202, switch 204 is closed. When condition hold function 203 is reset by asserting reset signal 205, switch 204 is open. When condition hold function 203 is set by evaluator 202, condition hold function 203 remains set independent of further activity from sensor 201 and evaluator 202. Consequently, when condition hold function 203 is set it turns on switch 204 and keeps it on even if conditions change and sensed conditions are no longer valid. When reset signal 205 is asserted, condition hold function 203 is reset, causing it to return to its previous state where switch 204 is off and it awaits a new valid condition. In the foregoing example, when the output of the accelerometer has exceeded the comparator's reference voltage, the set/reset flip flop (serving as condition hold function 203) is set and switch 204 is closed. The set/reset flip flop, remains set, even if the output of the accelerometer falls below the reference voltage. Thus, the switch is closed when a shock of high amplitude occurs, and it remains closed until a reset signal 205 is asserted, resetting the set/reset flip flop.

It will be understood by those skilled in the art that condition hold function 203 could be configured to be part of evaluator 202. It will be further understood by those skilled in the art that switch 204 can be any type of switch that is activated by a signal. Examples of such a switch include but are not limited to Field Effect Transistors (FETs), bipolar transistors, relays, and other similar controlled switches. It will also be understood that condition hold function 203 can be configured in a variety of ways to accomplish certain tasks, e.g.: 1) responding to a signal from evaluator 202 that indicates a valid condition has been sensed by causing switch 204 to be closed, 2) to keep switch 204 closed independent of further condition sensor activity, becoming unresponsive to signals from evaluator 202, and 3) responding to a reset signal by opening switch 204 and once again becoming responsive to signals from evaluator 202.

Condition sensor 201, evaluator 202, condition hold function 203 and switch 204 may make up at least part of sensor-controlled switch 210.

Switch 204 is coupled to power source 208. Power source 208 can be a battery, an energy harvester such as a solar cell, a capacitor, fuel cell or some combination of these as but a few examples. It can also be another portable power source.

U.S. Pat. Nos. 7,507,946 and 7,420,149 teach using a sensor to generate an interrupt in a microprocessor and to bring it out of a low power sleep mode to a state of higher power operation. An example they give is using a microphone which generates an interrupt when an audio signal above a defined threshold is picked up by the microphone. Using a sensor to generate an interrupt of a microprocessor is given as one of multiple alternative methods for interrupting a microprocessor and bringing it out of a sleep mode. They characterize a sleep mode as a state of operation where "the processor 61 is deactivated except for a low power timer" [U.S. Pat. No. 7,420,149 column 4 lines 57-58].They discuss the use of a timer to interrupt the microprocessor and bring it out of the sleep mode.

Through the use of the microprocessor's interrupt processing capability, the microprocessor "wakes up and acts according to its defined settings. For example, the node camera may act differently depending on whether it was the low power timer or the sensor which generated the interrupt. In another example, the node camera has multiple low-power timers, with each low-power timer causing a different reaction." [U.S. Pat. No. 7,420,149 B2 column 8, lines 3 through 9].The ability to act differently depending on the interrupting source comes from the microprocessor's interrupt handling capability. Each interrupting source is recognized uniquely by the microprocessor's interrupt handling hardware, and each redirects the microprocessor to a unique interrupt subroutine where tasks applicable to that interrupting source are executed. Clearly, in order to provide this advantage of acting differently depending on the interrupting source, at least the part of the microprocessor's interrupt handling capability that recognizes the interrupting source and can route the processor to a corresponding subroutine must be on and functional. Likewise, when a timer is used to periodically interrupt the microprocessor in a duty cycled scheme, the timer must be on, consuming a small amount of power with every clock cycle. Indeed, U.S. Pat. Nos. 7,507,946 and 7,420,149 discuss keeping a small timer and interrupt circuit active, or using a small timing and interrupting routine to facilitate waking the microprocessor back up from a sleep mode [U.S. Pat. No. 7,420,149 column 6, lines 23 through 29].

In the inventive technology herein described, neither interrupt circuitry nor timer circuitry is necessary to accomplish the task of managing power to a device. Instead of using a timer or sensor to interrupt a processor that is in a sleep mode, which processor then enables power to other devices, the inventive technology described herein uses sensor-controlled switch 210 to turn power on to a device which is normally unpowered. There is no timer running and no interrupt handling capability functioning, therefore there is no 'sleep mode' as described in U.S. Pat. Nos. 7,507,946 and 7,420,149. It will be appreciated that in some embodiments, sensor-controlled switch 210 can be completely passive, consuming no power while sensing conditions and closing switch 204 when conditions are valid. In other embodiments, evaluator 202 and condition hold function 203 can be active but static, meaning that they receive power from power source 208 but do not change state unless a valid condition occurs and therefore consume very little power.

In contrast to U.S. Pat. No. 9,656,621 which maintains radio communication with a hub in the minimal power configuration in order to remain responsive to the hub, the inventive technology herein described disables radios after surroundings data has been transmitted and switch 204 is opened.

FIG. 2 shows direct coupling of power source 208 to evaluator 202, and condition hold function 203, implying that these receive power to accomplish their functions. No power connection is shown for condition sensor 201, implying that the sensor in the illustrated embodiment is passive. It will be understood by those skilled in the art that although evaluator 202 and event hold function 203 show a connection to power source 208, these could also be designed to be passive, requiring no connection to power. Likewise, condition sensor 201 could be connected to power source 208 if desired in order to support amplification or other enhancements.

Sensor-controlled switch 210 is useful in low power applications where a device is to be turned on only when valid conditions are sensed.

Figure 3:
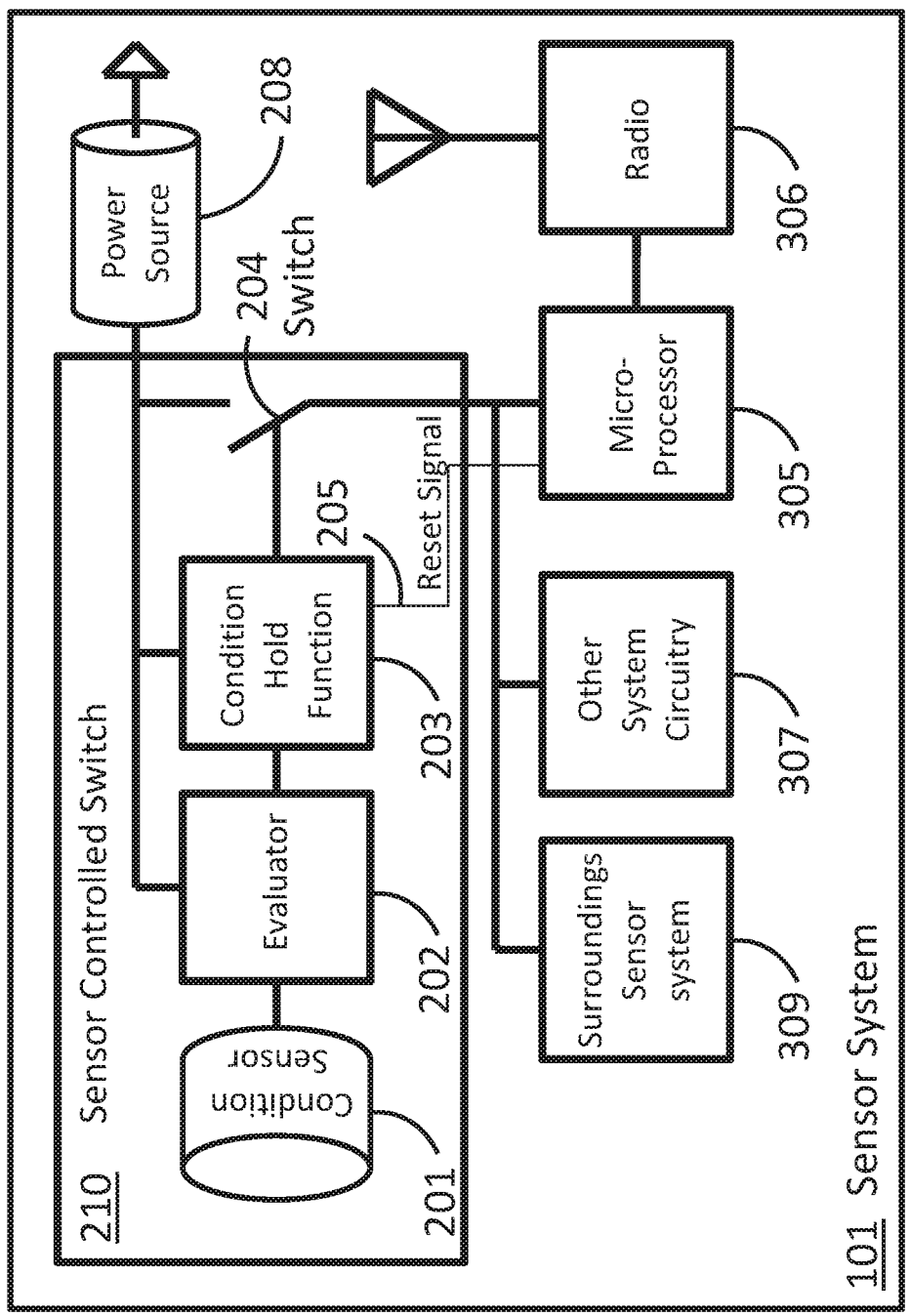
FIG. 3 shows an embodiment of a sensor system that includes a sensor-controlled switch.

Referring now to FIG. 3, an embodiment of sensor system 101 will be explained in more detail. Through switch 204 of sensor-controlled switch 210, power is provided to microprocessor 305, radio 306, surroundings sensor system 309, and other system circuitry 307. Because microprocessor 305 can enable power to other circuitry through other switches and enable functions, It will also be understood by those skilled in the art that circuitry such as surroundings sensor system 309 and other circuitry 307 could be designed to have their own switch, regulator or other power enable/disable function and thus could be coupled directly to power source 208 instead of through switch 204. These would then be enabled or disabled by microprocessor 205. Microprocessor 305 could also receive power through a regulator that is enabled by switch 204, thus not being directly connected but coupled to switch 204 through the regulator. FIG. 3 does not show all these possible connections, but it will be understood by those skilled in the art that the blocks in FIG. 3 can be coupled in a variety of ways, while still accomplishing the objective of conserving power and adhering to the spirit of the inventive technology.

In at least one embodiment, microprocessor 305 also sets up and configures surroundings sensor system 309. Signals from surroundings sensor system 309 may be transmitted as digital data to human interface device 103, which processes this data and presents it to the user in a useful form.

Radio 206 is designed to transmit sensor data and other information to human interface device 103, and to receive commands and other information from human interface device 103.

When microprocessor 305 receives power and becomes fully operable, it begins executing instructions from the beginning of its instruction set. As it executes instructions from the beginning of its firmware set it may initialize memory locations and configure any needed peripherals. Because of the need to minimize power consumption, unneeded peripherals and functions are may not be enabled. Any needed interrupts are changed from their disabled state to an enabled state so that microprocessor 205 can respond to interrupts, otherwise these typically remain disabled.

Microprocessor 305 may facilitate processing of requests from and transfer of data to human interface device 103. In at least one embodiment, a user interaction with human interface device 103 causes it to request sensor data from sensor system 101. As human interface device 103 receives sensor data it processes it and makes it available to the user in a useful form. For example, human interface device 103 may house a display on which it can display video generated from image data requested and received from a sensor system that generates and transmits image data. Human interface device 103 may also have user input features such as pushbuttons, a touch screen, voice command input, or other activators.

When a point is reached where microprocessor 305 determines that all tasks have been completed, it disables radio 306 and may prepare circuits to be powered off and disable any circuits it is configured to disable. Microprocessor 305 then initiates a delayed shutdown. This delayed shutdown serves the purpose of preventing event sensor system 210 from responding to sensor events during a time when it is highly unlikely that human interface device 103 would be trying to commnunicate with sensor system 101. As part of the delayed shutdown process, which will be detailed in an upcoming discussion, microprocessor 305 asserts reset signal 205 to reset event hold function 203, which causes switch 204 to open and switch off power to microprocessor 305.

Use of sensor-controlled switch 210 to manage power is advantageous when compared to the use of a duty cycled system for two reasons. First, sensor-controlled switch 210 is always listening for valid conditions and therefore can immediately turn on circuitry when it detects a valid condition. It can immediately turn on radio 306, for example, so that radio 306 can listen for transmissions from human interface device 103, or transmit an attention signal to let other radios know it is on, or a combination of both. While sensor-controlled switch 210 is listening, there is no need to provide power to circuitry such as interrupt responsive circuitry or timer circuitry. Instead, all circuitry can be completely off. In contrast, a duty cycled system cannot receive or respond to radio signals during the time it is in a low power state. Therefore, a system that relies on a duty cycled radio will incur an average response delay of half of the time that the duty cycled radio is in the low power state. If the duty cycled radio has just completed a listening cycle when a transmitter begins sending requests to respond to the duty cycled radio, the duty cycled radio will not be able to receive the request and respond until it has completed the low power portion of its duty cycle and turns on to listen mode again. In some systems this delay could be 1 second. In other systems the delay could be as much as an hour or more. With sensor-controlled switch 210, however, the system is always listening for conditions deemed valid for turning on radio 306.

A second advantage of using sensor-controlled switch 210 is that sensor-controlled switch 210 can be designed to consume very little power [or no power] so that overall system power consumption is less than would be the case with a duty cycled system. This is because in a duty cycled system the microprocessor and radio must turn fully on in regular intervals in order to listen for transmissions often enough that a user doesn't sense excessive delay. In the case where a passive sensor-controlled switch 210 is used, power consumption can be virtually zero while in listening mode. There is no need to provide power to circuitry supporting duty cycling such as interrupt responsive circuitry or timer circuitry. Instead, all circuitry can be completely off.

In an example comparison of a system designed around sensor-controlled switch 210, a passive piezoelectric accelerometer can be used for condition sensor 201. A MAX9117 comparator could be used with a high resistance voltage divider setting a reference voltage. The MAX9117 draws 0.60 uA of current. A set/reset flip flop could be configured using a 74AUP2G02D dual NOR gate which draws 0.5 uA when static. With this circuitry then controlling a P-Channel MOSFET to turn on power to a device the total power consumption would be 1.1 uA. In a system using a battery with life 3 Amp-hours, the battery life would be 3Amp-hours/1.1 uA=311 years.

The battery drain effects from the sensor-controlled switch system would be dominated by battery self-discharge effects and battery drain from the sensor-controlled switch would be negligible. In a completely passive design, current would be virtually zero when switch 204 is off.

In contrast, in a duty cycled system using a low power radio combined with a microprocessor such as Texas Instruments' CC2545, a sleep mode that keeps timers and interrupts functioning may consume 0.9 uA. When the radio is configured to listen for transmissions it may consume 26 mA.

The radio may need to listen for 5 mS in order to reliably receive a transmission sent from another radio that is trying to communicate with it. And the radio should listen at least once per second so that a user doesn't detect a significant response delay. In a duty cycled scheme where the radio is awakened from sleep once per second to listen for 5 mS, it would consume an average of 0.9 uA*0.995+26 mA*0.005=131 uA of current. With a 3 Amp-hour battery, this system would last around 2.6 years (disregarding self discharge effects). This illustrates a significant advantage in battery life of the sensor-controlled switch system versus the duty cycled radio system.

Sensor system 101 also contains surroundings sensor system 309. Surroundings sensor system 309 senses the surroundings of sensor system 101, and may process this data at least partially, providing surroundings data. The surroundings data is then available to be transmitted by radio 306 to human interface device 103. In at least one embodiment surroundings sensor system 309 senses images, producing image data and compresses the data providing surroundings data that is compressed image data. In this case human interface device 103 receives and decompresses this data and displays images. In at least another embodiment, surroundings sensor system 309 senses proximity of objects using ultrasonic ranging, providing surroundings data that comprises proximity data. Human interface device 103 receives this proximity data and processes it, providing audible and visual indicators corresponding to proximity of objects according to data received and processed from surroundings sensor system 309.

Other possible surroundings systems that could produce surroundings data include: infrared imagers, ultrasonic imagers, radar ranging systems, and laser ranging systems. In any case surroundings sensor systems sense surroundings external to sensor system 101, processes these, producing surroundings data. This data is then transmitted to human interface device 103, which processes and presents aspects of the data to a driver in a useful form.

Figure 4:
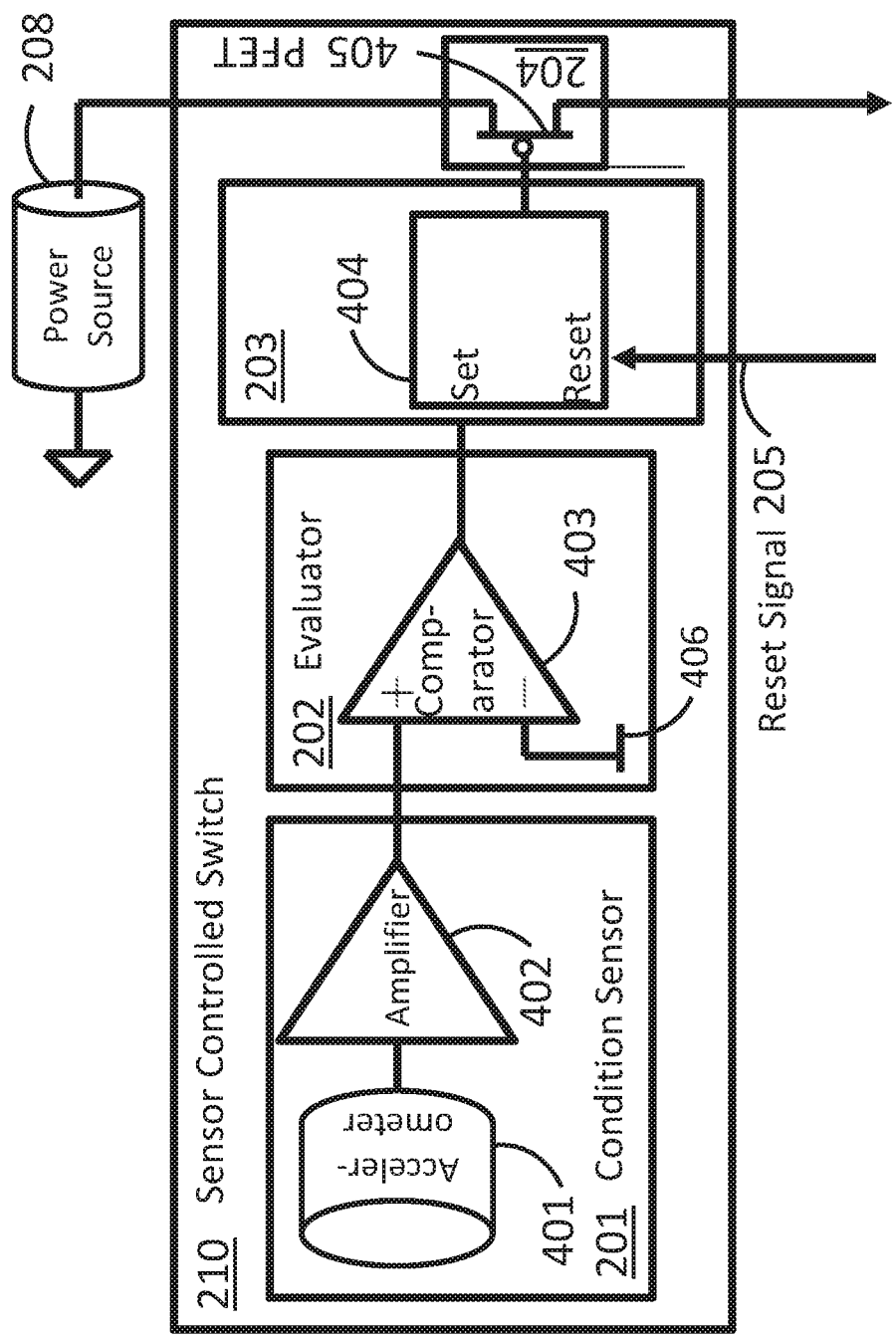
FIG. 4 shows a sensor-controlled switch that includes an accelerometer.

Additional aspects of the inventive technology will now be detailed. In at least one embodiment, illustrated in FIG. 4, condition sensor 201 may comprise accelerometer 401 and amplifier 402. Amplifier 402 is added in order to increase the sensitivity of accelerometer 401. To detect when acceleration levels exceed a target, evaluator 202 may comprise voltage comparator 403 configured to compare the output of the accelerometer against reference voltage 406. When the output of accelerometer 402 exceeds reference voltage 406, the output of voltage comparator 403 asserts high. In this embodiment, event hold function 203 may comprise set/reset flip flop 404. When the set input of set/reset flip flop 404 is asserted high, the output is set low and remains low until at a later time the reset input of set/reset flip flop 404 is asserted high, at which time the output returns to the high state. This output from set/reset flip flop 404 is coupled to switch 204, which in this embodiment may comprise PFET 405. When the gate of PFET 405 is high, PFET 405 is off, preventing flow of current through its channel. When the gate of PFET 405 is low, however, current is allowed to flow from power source 208 through PFET 405 to microprocessor 305 and other circuitry connected to PFET 305.

Accelerometer 401 detects small amounts of motion and vibration in the vehicle. For example, when a driver gets into the vehicle there is a small amount of rocking motion that would be detectable by accelerometer 401. It would also detect small vibrations from when the vehicle is started. Additionally, when the vehicle is taken out of park and put into reverse or drive small motions accompanying the engagement of gears would be detected by accelerometer 401. Also, driving would generate vibration activity that accelerometer 401 would pick up. In each case, vibration of sufficient amplitude would cause accelerometer 401 to output a signal of sufficient amplitude that when amplified by amplifier 402 would cause voltage comparator 403 to output a high level and set set/reset flip flop 404, turning on PFET 405 and causing power to be made available to microprocessor 305 and other circuitry.

After microprocessor 305 has completed tasks and is ready to shut down, it initiates a delayed shutdown. As part of the delayed shutdown, explained in detail later, it asserts reset signal 205 coupled to set/reset flip flop 404 which causes the output of set/reset flip flop 404 to go high, turning off PFET 405. Set/reset flip flop 404, in at least one embodiment, is configured to stay in its reset state and not respond to evaluator 202 activity for a delay period. As mentioned previously this serves the purpose of preventing circuitry from being turned on again in response to a sensed event immediately after microprocessor 305 has determined it can be shut down, thus preserving power.

Figure 5:
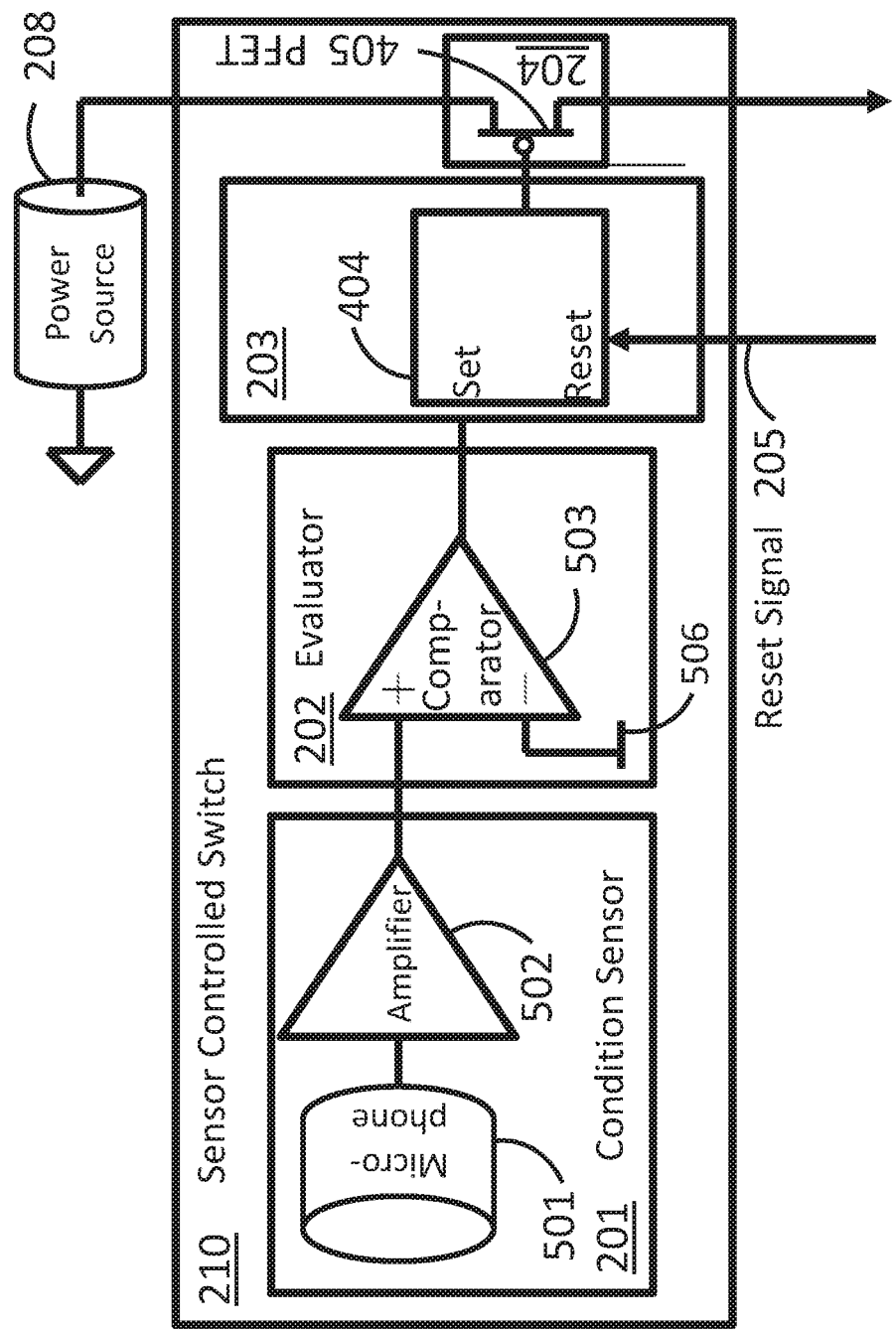
FIG. 5 shows a sensor-controlled switch that includes a microphone.

In at least another embodiment, illustrated in FIG. 5, condition sensor 201 comprises microphone 501 and amplifier 502. Similar to accelerometer 401, microphone 501 picks up sound waves associated with opening and closing car doors, starting of the vehicle, putting it into gear, and general driving. With evaluator 202 configured as voltage comparator 503 with reference voltage 506, similar to the case with accelerometer 401, evaluator 202 would set set/reset flip flop 404 when sound levels generate signal amplitudes in microphone 501 sufficient to exceed voltage reference, turning on PFET 405.

Figure 6:
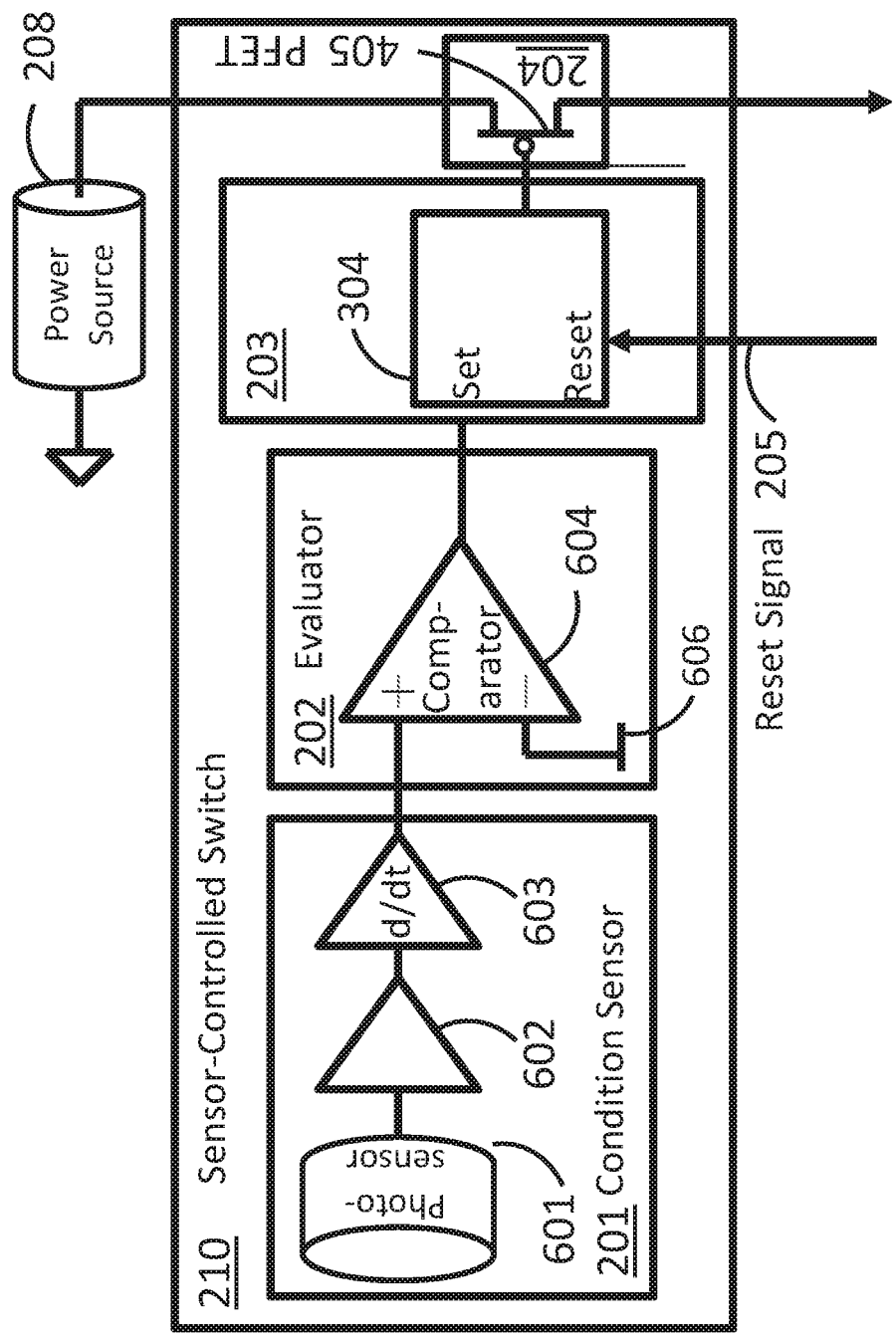
FIG. 6 shows a sensor-controlled switch that includes a photo-sensor.

In at least another embodiment, illustrated in FIG. 6, condition sensor 201 may comprise photo sensor 601, amplifier 602 and differentiator 603. In this embodiment, photo sensor 601 and amplifier 602 detect light levels and produce a voltage corresponding to the level of light falling on photo sensor 601. In one use of this embodiment, photo sensor 601 is mounted near vehicle 102's reverse light. When vehicle 102 is shifted into reverse and its reverse light turns on, photo sensor 601 outputs an increased voltage level which is amplified by amplifier 602 and differentiated by differentiator 603. The differentiated signal is then compared to voltage reference 606 by comparator 604. If the light level change was large enough, as would be expected when the reverse lights turn on, voltage reference 606 would be exceeded and set/reset flip flop 404 would be set, causing PFET 405 to turn on, providing power to microprocessor 305 and enabling subsequent operation.

In at least another embodiment, sensor-controlled switch 210 may comprise what we call a 'power up radio'. A power up radio is a very low power or passive radio wave detector which is tuned to a radio frequency carrier and which converts amplitude or other modulations on that RF carrier to a baseband signal containing amplitude variations. These amplitude variations are then evaluated by an evaluator circuit and if they meet certain predetermined criteria, the evaluator circuit turns on a power switch, enabling power to flow to a target circuit.

The power up radio described above is very similar to a 'wake-up radio' which is known in the industry. A 'wake up radio' contains an antenna, a passive or low power radio frequency detector and an evaluator similar to that which we have called a power up radio. However, in contrast to a power up radio, where the output of the evaluator turns on power to a target circuit that has been completely off, the output of the evaluator in a 'wake up radio' is typically used to interrupt a microprocessor that is being held in a sleep state such that it 'wakes up' the microprocessor. As discussed previously, the microprocessor sleep state wherein interrupts are monitored consumes a small amount of power which may be more than is desirable for overall system requirements. In the case of the inventive technology herein described, however, the microprocessor and all of its circuitry, including its interrupt processing capability, are completely cut off from power by power switch 204. Consequently no power is consumed by the microprocessor when it is in the off state.

Gu and Stankovic [Gu, Lin and John A. Stankovic, "Radio-Triggered Wake-Up for Wireless Sensor Networks", Journal of Real-Time Systems Volume 29 Issue 2-3, March 2005; incorporated herein] describe various passive circuits that are configured to interrupt a processor in a wake-up radio scheme. They use an antenna and a passive tuned circuit followed by a diode detector and low pass filter. This circuitry behaves very much like a passive crystal radio. The antenna picks up radio waves and passes the resulting power through the tuned circuit which attenuates all but a narrow frequency band. This remaining RF signal is then rectified and low pass filtered. If the incoming radio wave is of sufficient amplitude, the voltage out of the detector circuit can be large enough to interrupt a microprocessor. With minor modification, this circuit could be converted to a power up radio. A passive or active condition hold function would need to be added followed by a controlled switch.

Bdiri and Derbel [Bdiri, Sadok and Faouzi Derbel, "An Ultra-Low Power Wake-Up Receiver for Real-time constrained Wireless Sensor Networks", AMA Conferences 2015, Proceedings SENSOR 2015 pgs. 612-617, May 2015; incorporated herein] describe using low power amplification after passive detector circuitry similar to that of Gu and Stankovic and then feeding the amplified low frequency signal to an Austria Microsystems AS3933 chip that senses low power signals and detects patterns in the amplitude modulation pattern. When the AS3933 detects the presence of a target pattern in the low frequency signal it asserts a signal called 'WuInt', for 'wake up interrupt'. This signal is then connected to one of the interrupt inputs of a microprocessor to interrupt the sleeping processor and cause it to continue executing instructions at an interrupt subroutine.

In order to make a power up radio function instead of a wake up radio function, we do not connect the WuInt signal to an interrupt input of a microprocessor. We instead couple the 'WuInt' line to a condition hold function 203 such as set/reset flip flop 404, the output of which is then coupled to switch 204. We rename the line 'PwrEn' for 'power enable'. The circuit now listens for an RF carrier with amplitude modulation that is in the pattern recognizable by the AS3933. When such a pattern is detected in the RE carrier, PwrEn is asserted, which sets set/reset flip flop 404 and turns on switch 204. This configuration provides the previously described advantages of low power consumption and immediate response. Also, it is highly selective and would minimize undesired closure of switch 204.

As a part of an embodiment of the inventive technology, condition sensor 201 may comprise the above mentioned antenna, the tuned circuit, the diode detector, and low pass filter. Evaluator 202 may comprise the amplification circuitry and AS3933. It will be understood by those skilled in the art that for short range applications the amplification circuitry can be removed, and the low pass filter output can directly drive the AS3933. The resulting sensor-controlled switch would be responsive to radio signals of a certain frequency with a certain amplitude modulated pattern.

When using condition sensor 201, there could arise conditions that cause excessive and unwanted noise which may meet evaluator 202's criteria, resulting in frequent undesired closures of switch 204. For example, if condition sensor 201 is a power up radio described above that is made less selective in order to reduce system cost, many false assertions of event hold function 309 could arise which would continually cause switch 204 to turn on, consuming power unnecessarily. Similarly, if condition sensor 201 is an accelerometer that is designed to be very sensitive to small vibrations in order to detect a door closing, a driver entering the vehicle, or the gear train engaging, it may continually experience accelerations that turn on switch 204 while driving at high speed. Consequently, power would be saved when the vehicle is off, but when the vehicle is on, the system would be frequently on, even when it is not needed, consuming significant power.

When in such a condition where there are frequent false signals that can cause switch 204 to turn on unnecessarily, it is desirable to limit these. As described above, this can be done by introducing a delayed shutdown after radio 306 has finished listening for communication from human interface device 103 or transmitting an attention signal. During this delay, sensor system 101 is put in a low power state and prevented from responding to events until the delay is passed. For example, suppose sensor system 101 is constructed to transmit image data to human interface device 103 to be displayed as video. If the user no longer needs video and video is shut off, either by the user directly or by a timeout function, it is highly unlikely that the user will want to turn on video again immediately. Therefore, a shutdown delay lasting one second, following the end of video delivery, during which sensor system 101 does not respond, for example, to requests to display video again, would not be noticeable by the user. However, it would prevent power from being immediately turned on again if regular false events are occurring. This one second delay would also be imposed after false events causing switch 204 to turn on, thus limiting the frequency of false events to no more than one per second.

U.S. Pat. No. 9,656,621 maintains communication with a hub following a period where it has transmitted surroundings data in what is called a low power mode, and thus consumes at least enough power to keep the radio on and capable of transmitting at a low data rate. Following the task of transmitting surroundings data, the next step in U.S. Pat. No. 9,656,621 is "operating the wireless communication module in a low-power communication mode comprising transmitting data below the threshold data transfer rate" [U.S. Pat. No. 9,656,621 claim 1 and 12]. In contrast, the inventive technology herein transitions from a mode of transmitting surroundings data to a low power state wherein radios are disabled. As a result, less power is consumed. Sensor-controlled switch 201 can be made sensitive enough that it will turn on when needed, enabling radio 306 to listen at times when it is most likely that human interface device 103 is sending a transmission. The delayed shutdown can prevent it from consuming excessive power if false assertions are too frequent, as has been noted previously.

Figure 7:
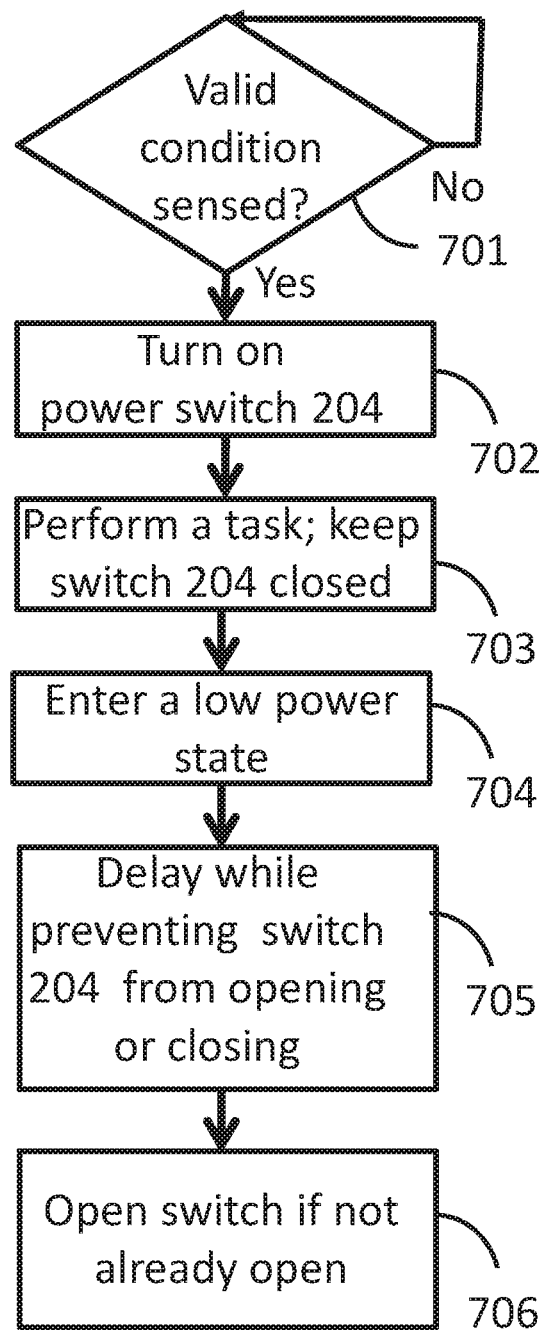
FIG. 7 shows a flow diagram for a low power sensor system.

Referring now to FIG. 7, a method for operating sensor system 101 is now described. With switch 204 open, sensor-controlled switch 210 monitors conditions, as shown in block 701. When a valid condition is detected, condition hold function 203 is set and switch 204 is closed, shown in block 702. For example, in the case where sensor-controlled switch 210 comprises accelerometer 401, amplifier 402 and comparator 403, sensor-controlled switch 210 monitors vibrations and motion picked up by accelerometer 401 and compares the amplitude of these signals to voltage reference level 406. When a vibration causes the accelerometer to output a voltage signal that when amplified by amplifier 402 is larger than voltage reference 406, set/reset flip flop 404 is set, causing its output to drop low and turning on PFET 405.

When condition hold function 203 is set, it cannot be reset by evaluator 202 as it evaluates activity on sensor 201 and so switch 204 of sensor-controlled switch 210 is kept closed while a task is performed, shown in block 703. Obviously, switch 204 must be kept closed and unresponsive to sensor activity so that operations performed by microprocessor 305 and other circuitry can proceed undisturbed. For example, after sensor switch 210 is closed radio 306 could be enabled to listen for a transmission from human interface device 103. If it receives a valid transmission, further communication between radio 306 and human interface device 103 could include the request for and transfer of imaging data to provide video to human interface device 103. In another example, radio 306 could be enabled to transmit an attention signal to signal to another radio that radio 306 is on. It will be apparent that any variety of tasks or tasks of any complexity could be performed while switch 204 is closed.

After microprocessor 305 has completed a function such as turning on radio 306 to listen for a transmission from human interface device 103, transmitting an attention signal or delivering image data to human interface device 103, microprocessor 305 may initiate a delayed shutdown. This may be done by entering a low power state, shown in block 704, and remaining in this low power state for a period of time while not allowing switch 204 to open or close, shown in block 705. A delay function determines the duration of the delayed shutdown. Following the delayed shutdown, switch 204 is opened if it is not already open, and circuitry connected to switch 204 is shown in block 706.

In an example delayed shutdown, microprocessor 305 performs any preparations for shutdown needed. The delay function in one example is performed by a timer. Microprocessor 305 may set a timer and then put itself in a low power sleep mode. During this time switch 204 remains closed because microprocessor 305 is in a low power sleep mode and therefore does not assert the reset signal 205. Because microprocessor 305 is in a low power sleep mode and other circuits are disabled or also in a low power state, sensor system 101 is in a low power state. When the timer expires and wakes up microprocessor 305, microprocessor 305 may assert reset signal 205, which would lead to condition hold function 203 being reset, and switch 204 being opened. This is different from what is done in U.S. Pat. Nos. 7,507,946 and 7,420,149, wherein a timer is used to wake up a processor following which it activates a radio or enters a listen mode. In contrast, the inventive technology herein described uses the timer to wake up a processor long enough so that it can issue a reset signal and shut down switch 204, removing power from the processor.

Figure 8:
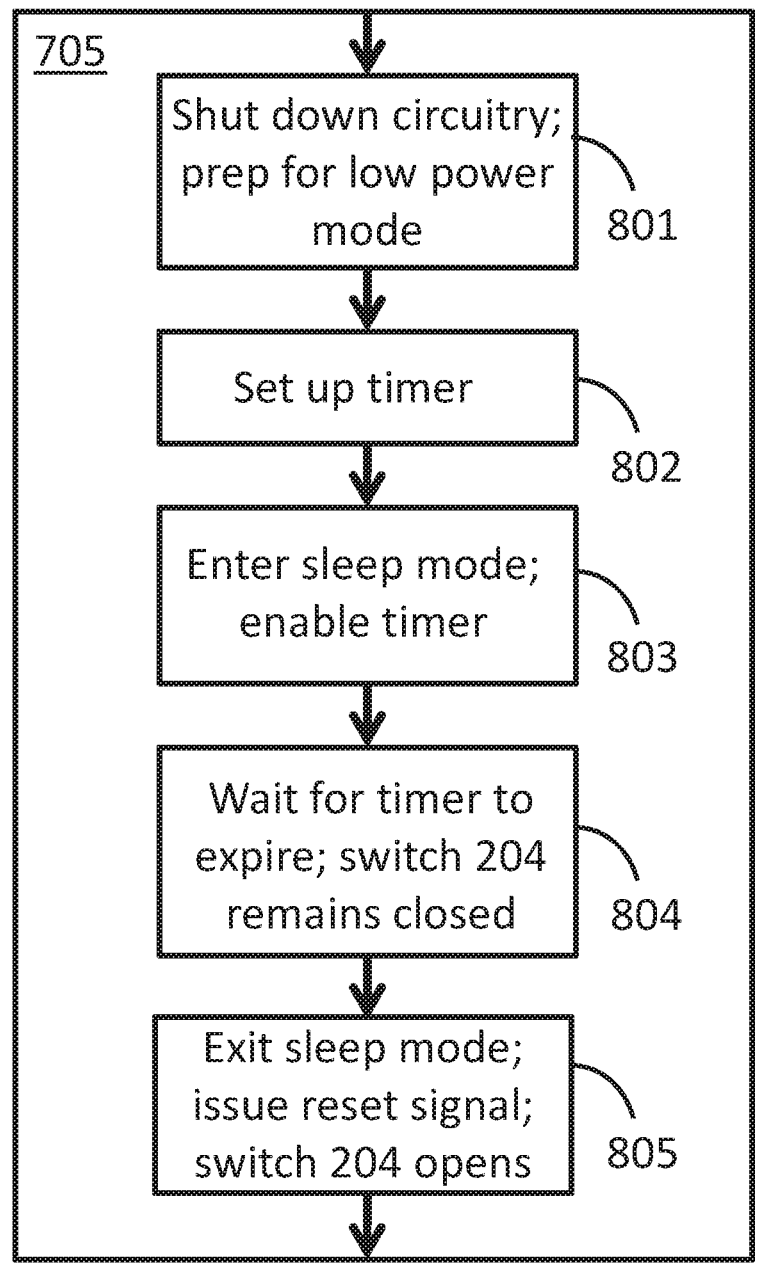
FIG. 8 shows a flow diagram for a delayed shutdown.

FIG. 8 illustrates at least one embodiment of a method for accomplishing the delayed shutdown shown in FIG. 7 block 705. When sensor radio 306 has finished listening for communication from Human interface device 103, microprocessor 305 shuts down other circuits and prepares to put itself in a low power sleep mode, as shown in block 801. Next, microprocessor 305 sets up a delay function by configuring a timer to wake it from the low power sleep mode, shown by block 802. Microprocessor 305 then puts itself in a sleep mode, shown in block 803, and the timer delays for a delay period, during which switch 204 remains closed, as shown by block 804. When the timer finishes its delay count, microprocessor 305 wakes up and issues a 'reset' signal to event hold function 203, causing switch 204 to open and removing power from microprocessor 305 and other circuitry, represented by block 805. FIG. 8 relates to FIG. 7 as follows. The step of entering a low power state, shown in block 704 of FIG. 7, occurs in steps 801 through 803 of FIG. 8. The step of waiting a delay while preventing switch 204 from opening or closing shown in block 705 of FIG. 7 is accomplished in block 804 of FIG. 8. Finally, the step of opening switch 204 if not already open, shown in block 706 of FIG. 7 is accomplished in block 805 of FIG. 8.

In another example of a delayed shutdown, condition hold function 203 has a delay function built into it using a capacitor charged by a fixed resistance. Microprocessor 305 performs any preparations for shutdown, then asserts reset signal 205. Condition hold function 203 is reset by reset signal 205, causing switch 204 to open, and also a starting a timer that inhibits condition hold function 203 from being set and closing switch 204. Because switch 204 is open and only the timer function and possibly other parts of sensor-controlled switch 210 are consuming power, sensor system 101 is in a low power state where until the delay expires, switch 204 can't be turned on by event hold function 203. After the timer expires condition hold function 203 would no longer be inhibited from being set, and sensor-controlled switch could begin again listening for valid events.

Figure 9:
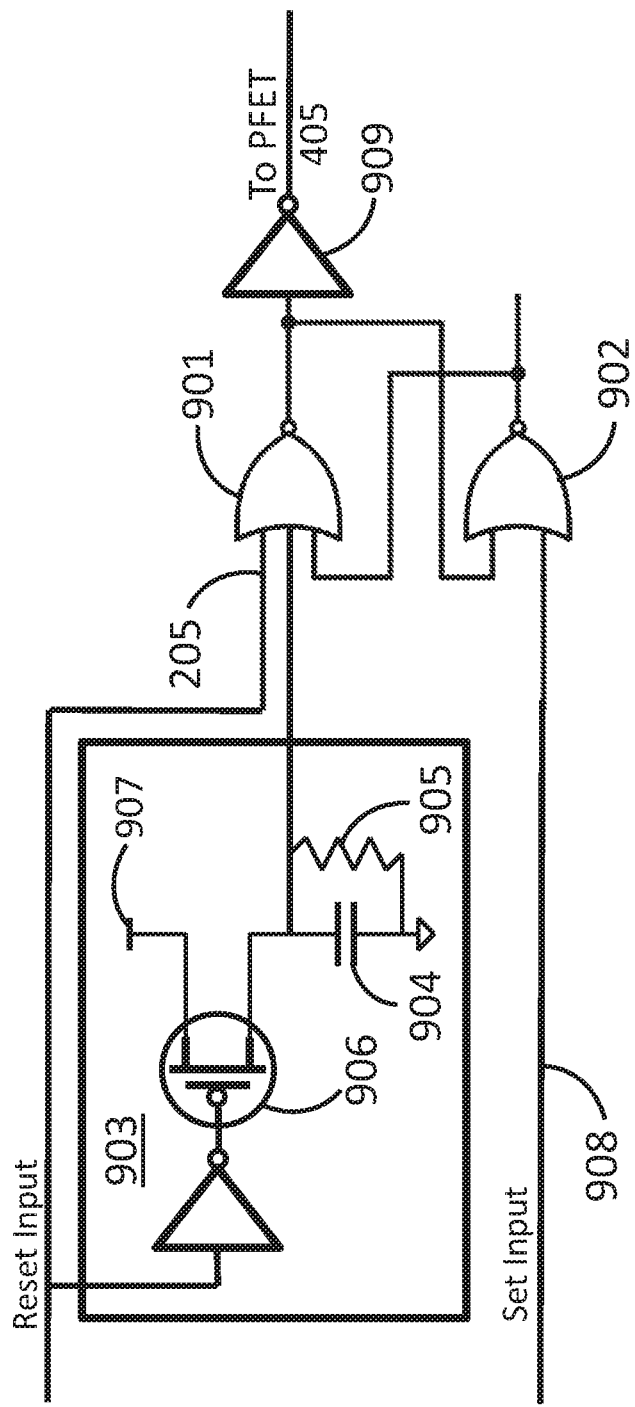
FIG. 9 shows a flow diagram for a condition hold function with delay function.

FIG. 9 illustrates this second example of at least one embodiment of a delay function for use in a delayed shutdown and configured to prevent condition hold function 203 from turning on switch 204 until the delay has passed. In this embodiment, the delay begins as condition hold function 203 is reset and switch 204 is turned off. Nor gates 901 and 902 are cross coupled and as such comprise a set/reset flip flop. NOR 901 has three inputs, while NOR 902 has two inputs. One input to NOR 901 is reset input signal 205, which is provided by microprocessor 305. One input to NOR 901 is connected to charge/discharge circuit 903. The other input to NOR 901 is the output of NOR 902. One input to NOR 902 is the set input signal 908 which is connected to the output of evaluator 202. The other input to NOR 902 is the output of NOR 901. One skilled in the art will recognize that in this configuration, when the input to NOR 901 coming from charge/discharge circuit 903 is low, a high input to the 'set' input 906 when 'reset' is low will turn on switch 204, while a high input to the 'reset' input 205 while 'set' is low will turn switch 204 off. When the input to NOR 901 coming from charge/discharge circuit 903 is high, however, the set/reset flip flop comprised of NOR 901 and NOR 902 will keep the switch off regardless of the state of the 'set' input 908.

The circuit of FIG. 9 is used as follows. When microprocessor 305 has completed its tasks and is ready to shut off switch 204, it asserts reset input 205 momentarily. This changes the state of NOR 901 and NOR 902, causing NOR 901 to go low and NOR 902 to go high. The momentary assertion of reset input 205 also momentarily turns on PFET 906 in charge/discharge circuit 903. Doing so causes capacitor 904 to charge to power supply voltage 907. After the 'reset' signal 205 is brought low again, PFET 906 shuts off and the output of charge/discharge circuit 903 remains high while capacitor 904 discharges through resistor 905 at a rate corresponding to the time constant of capacitor 904 and resistor 905. While the voltage on capacitor 904 is above the logic '0' threshold of NOR 901, the output of NOR 901 will remain low, keeping inverter 909 high which keeps switch 204 off and preventing NOR 901 from responding to assertions of the 'set' signal from evaluator 202. However, once the output of charge/discharge circuit 903 falls below the logic '0' threshold of NOR 901, it will allow assertions of the 'set' signal to change the state of condition hold function 203 and turn switch 204 on.

For improved performance of the above circuit it may be preferable to use NOR gates with Schmitt trigger inputs for NOR 901 and NOR 902. As is understood by those skilled in the art, a Schmitt trigger input converts an analog input signal to a digital signal. This may make the delay time determined by the charging of capacitor 904 more predictable and repeatable.

The above described delayed shutdown becomes important when there is a high level of noise causing condition sensor 201 to output significant activity which can cause frequent false evaluations by evaluator 202 and consequent false assertions of condition hold function 203. If there were no such delay, under noisy conditions significant battery power could be expended as condition sensor 201 and evaluator 202 frequently assert condition hold function 203 and turn on power through switch 204. By adding a delay, false assertions can be made to happen no more often than the duration of the delay in the worst case, which could by design be no more often than a duty cycled system. In other words, if the shutdown delay is 1 second, then the power can only turn on once per second in a noisy environment. This is no worse than in a duty cycle system where the cycle period is one second.

In the best case, when the environment is quiet, power switch 204 would only turn on when a valid event has occurred.

Consider the example of a vehicle wherein sensor 201 is an accelerometer, and the shutdown delay is one second. During the time that the vehicle is parked in the garage, switch 204 would likely not be turned on at all, conserving significant power. On the other hand, if the vehicle is driving down the freeway on a windy day, the output of the accelerometer may frequently meet evaluator 202's criteria, but switch 204 would not be turned on any more often than once per second. The power consumption rate in this latter noisy case would be no worse than if a timer with a period of one second were turning on the system in a duty cycled configuration.

Figure 10:
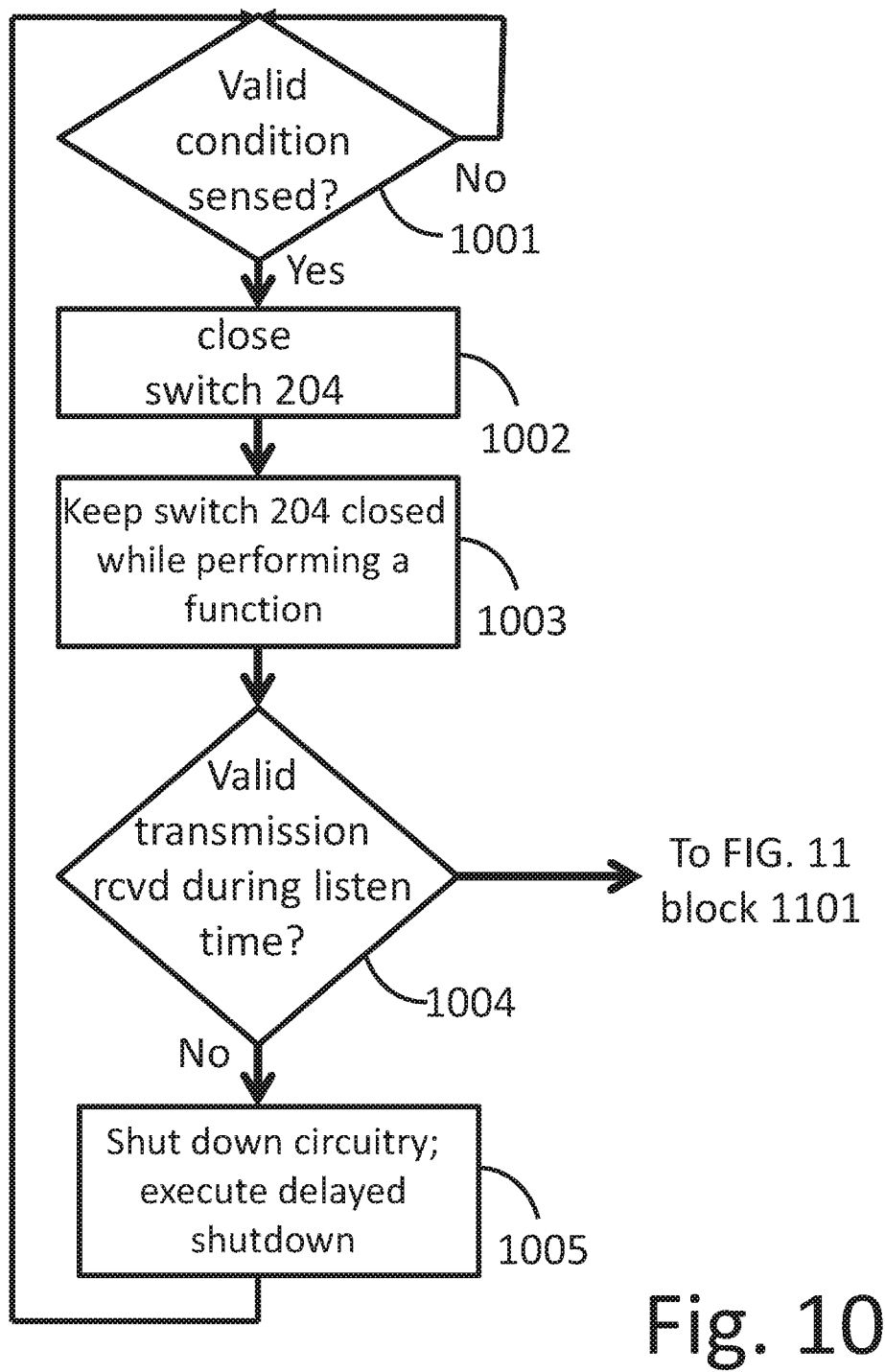
FIG. 10 shows part of a flow diagram fur a low power sensor system.

Referring now to FIG. 10 and FIG. 11, a method for operating sensor system 1001 in a vehicle sensing application is now described. With switch 204 off, sensor system 101 awaits a valid condition in a condition sensing mode, as shown in block 1001. When a condition arises which matches evaluator 202's criteria, evaluator 202 sets condition hold function 203 which turns on switch 204, as shown in block 1002. With switch 204 on, power is allowed to flow to microprocessor 305 and other circuitry. Microprocessor 305 turns on sensor radio 306 and configures it to listen for transmissions from Human Interface Device 103, shown in block 1003. Radio 306 then listens for a valid transmission during a listen time, shown in block 1004.

In a digital radio, it is understood that digital data is encoded on a carrier frequency using an encoding scheme such as Gaussian Frequency Shift Keying. Data is encoded and transmitted in small groups of data called packets. Each packet contains header information useful to the receiver for properly receiving and processing the data. For example, a packet may contain a packet number which aids the receiver in ensuring it has received all the data in the correct order. It further contains user data. Finally, it contains error detection data such as a cyclic redundancy check (CRC) code. A valid transmission is a transmission received and detected by radio 306 wherein no error has been detected through the use of CRC data or another error detection scheme.

If no valid transmission is received by radio 306 from human interface device 103 within a predetermined time limit, microprocessor 305 prepares other circuits for shut down, and then initiates a delayed shutdown operation, shown by block 1005 and described earlier. Once the delayed shutdown operation is complete, microprocessor 305 and other circuitry are completely unpowered and in an off state, awaiting a valid sensor condition, shown by block 1001.

On the other hand, if radio 306 receives a valid transmission from human interface device 103, sensor system 101 sends a response to human interface device 103 and prepares to communicate further with human interface device 103, as shown in FIG. 11 block 1101. Sensor system 101 then continues to receive transmissions from human interface device 103, shown in block 1102, and to respond and perform tasks relating to these transmissions along with other tasks, shown in block 903. For example, human interface device 103 might transmit a command to sensor system 101 to turn surroundings sensor 106 on and to transmit an acknowledgement back to human interface device 103 when that task is completed.

In another example, human interface device 103 might transmit a request for sensor data. When sensor system 101 receives this request, it would digitize sensor data, process it, and transmit the data back to human interface device 103. Human interface device 103 would then process the processed sensor data and send it to the user interface to be presented as audible signals or a visual display. This communication continues until the sensor system is either instructed to turn itself off, or until a timer internal to the sensor system signals that it is time to shut itself off, as shown in decision block 1104. If either of these occur, the delayed shutoff operation described earlier and shown in block 1005 is performed.

Aspects of the inventive technology relating to human interface device 103 will now be discussed. As mentioned earlier, backup cameras are most useful when backing up. With no connection to the reverse light wiring there is no wired signal that can be used to determine that the camera is needed for backing. This need is addressed in additional embodiments of the inventive technology.

Useful to the inventive technology herein described is the fact that the power port of most vehicles is off when the vehicle is not running, and is turned on when the driver starts the vehicle, remaining on when the vehicle is running. Also useful to the inventive technology is the fact that a driver is most likely to back up a vehicle soon after it has been started, as would be the case when starting the vehicle and backing out of a garage, or starting a vehicle and backing out of a parking spot. With these facts in mind, in another aspect of the inventive technology that is optional but not necessary, human interface device 103 may be configured such that when human interface device 103 is first powered up, it communicates with sensor system 101 commanding it to transmit surroundings data that it can make available to the driver. Thus, when a driver first starts a vehicle, surroundings data may be made available to the driver at a time when he or she is most likely to need it. As indicated, this is an optional feature.

As an example, consider an embodiment where sensor system 101 comprises a surroundings sensor 309 that is a video camera system mounted to the back of a vehicle, and human interface device 103 is a video monitor mounted in view of a driver. When the driver starts the vehicle, the video monitor powers up and communicates with the video camera and video is displayed on the monitor. The driver then has available video of the region behind the vehicle immediately after the vehicle has been started, when he or she is most likely to back up. By configuring the human interface device 103 which in this case is a video display to request and display video data, a driver has backup camera video available most of the time when needed. Again, this is an optional and not a necessary aspect of the inventive technology.

In order to conserve battery power, in another aspect of the inventive technology that is optional and not necessary, human interface device 103 is configured to complete communications with sensor system 101 after a preset amount of time. At this point, human interface device either sends a shutdown command to sensor system 101, or stops communicating with sensor system 101. In either case, sensor system 101 returns to its lowest power consumption state. The duration of this optional automatic shutdown feature can be adjusted through a user menu for a duration ranging from a few seconds to several minutes. Another option can allow the camera to remain on indefinitely.

Using again the above example where surroundings sensor 309 comprises a video camera system and human interface device comprises a video display, video would turn on as the vehicle is started. After video has been displayed for a period of time, say 30 seconds, the camera would shut off as described above, thus preserving battery power.

In another optional aspect of the inventive technology, human interface device 103 may be configured with user input features such as pushbuttons, touch screen, or other activators. Human interface device 103 may be further configured to communicate with sensor system 101 in response to a human action such as the pressing of a button, the touching of a screen, or the touching of another activator. As a result, surroundings data may be requested and received by human interface device 103 from sensor system 101, and human interface device 103 may present this data to a user in useful form.

Returning to the above video example, one can appreciate that this aspect of the inventive technology may enable a user to view video at virtually any time when the vehicle is on. With the press of a button, the touch of a touch screen, or the activating of an activator, video of the area behind, to the sides, or even in front of a vehicle may be viewable by a driver.

As can be easily understood from the foregoing, the basic concepts of the present invention may be embodied in a variety of ways. It involves, e.g., both sensor techniques as well as devices to accomplish the appropriate sensor. In this application, the sensor techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "display" should be understood to encompass disclosure of the act of "displaying"—whether explicitly discussed or not—and, conversely, were there effectively disclosure of the act of "displaying", such a disclosure should be understood to encompass disclosure of a "display" and even a "means for displaying". Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the sensor system/devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed. xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A vehicle sensing system, comprising:
    a surroundings sensor system that is configured to provide surroundings data;
    a sensor-controlled switch configured to sense conditions or events, said sensor-controlled switch reconfigurable between a closed configuration and an open configuration;
    said sensor-controlled switch coupled to a power source;
    said sensor-controlled switch configured to be unresponsive to said conditions or events when said sensor-controlled switch is in said closed configuration;
    a processor receiving power from said power source when said sensor-controlled switch is in said closed configuration;
    said processor coupled to said surroundings sensor system;
    a radio configured by said processor to listen for a transmission and to transmit said surroundings data; and
    a delay function that determines the duration of a low power mode during which said sensor-controlled switch is unresponsive to those of said conditions or events that would otherwise cause said sensor-controlled switch to reconfigure from said open condition to said closed condition if configured in said open condition;
    wherein while in said low power mode said vehicle sensing system is non-communicative with other systems and said sensor-controlled switch is disabled in order to conserve power.

2. The vehicle sensing system according to claim 1, wherein said processor receives power after being in a completely unpowered, uninterruptable state.

3. The vehicle sensing system according to claim 1, wherein said sensor-controlled switch does not comprise a timer to activate said sensor-controlled switch.

4. The vehicle sensing system according to claim 1, wherein said surroundings sensor system comprises a surroundings sensor system selected from the group consisting of an image sensing system, a sound sensing system, and a proximity sensing system.

5. The vehicle sensing system according to claim 1, wherein said transmission originates from a human interface device in a vehicle.

6. The vehicle sensing system according to claim 5, wherein said transmission originates from said human interface device in response to the starting of said vehicle.

7. The vehicle sensing system according to claim 1, wherein said vehicle sensing system is configured to operate on a vehicle with a reverse light and wherein sensor-controlled switch comprises an electromagnetic sensor configured to sense changes in light level of said reverse light.

8. A method for controlling power to a device, comprising:

sensing a condition or event with a sensor-controlled switch causing said switch to be reconfigured from an open configuration to a closed configuration as a result of said step of sensing;

keeping said sensor-controlled switch in said closed configuration while activating a radio;

entering a low power state in which said radio is deactivated and capability to receive communications and sense conditions or events is disabled in order to conserve power;

remaining in said low power state and preventing said sensor-controlled switch from reconfiguring from a closed configuration to an open configuration or from an open configuration to a closed configuration for a period of time;

exiting said low power state after said period of time; and reconfiguring said sensor-controlled switch to said open configuration if it is not already in said open configuration.

9. The method of claim 8, wherein said radio listens for a valid transmission.

10. The method of claim 8, wherein a processor that was previously unpowered and therefore uninterruptable while unpowered, and not in a sleep mode, receives power following said reconfiguration of said sensor-controlled switch to said closed configuration.

11. The method of claim 8, wherein a timer does not activate a radio.

12. The method of claim 8, wherein said sensor-controlled switch is unresponsive to sensed conditions or events while in said closed configuration.

13. The method of claim 8, wherein said sensor-controlled switch comprises an electromagnetic sensor configured to operate on a vehicle with a reverse light, said electromagnetic sensor configured to sense changes in light level of said reverse light.

14. A low power apparatus configured to operate on a vehicle with a reverse light and comprising:

a sensor-controlled switch that is reconfigurable between an open configuration and a closed configuration;

said sensor-controlled switch coupled to a power source;

said sensor-controlled switch configured to be unresponsive to conditions or events sensed by said sensor-controlled switch when said sensor-controlled switch is in said closed configuration;

said sensor-controlled switch allowing power to flow from said power source to a device when said sensor-controlled switch is in said closed configuration;

a radio configured to be activated when said sensor-controlled switch is in said closed configuration;

a delay function configured to determine a period of time during which said device is kept in a low power state after a task has been performed; and said sensor-controlled switch configured to be responsive to conditions or events sensed by said sensor-controlled switch after said period of time and when said sensor-controlled switch is in said open configuration, wherein said sensor-controlled switch comprises a photo sensor configured to respond to changes in the light level of said reverse light.

15. The vehicle sensing system according to claim 1, wherein said sensor-controlled switch is completely passive, requiring no power source.

16. The method of claim 8, wherein said sensor-controlled switch is completely passive, requiring no power source.

17. The low power apparatus of claim 14, wherein said sensor-controlled switch is completely passive, requiring no power source.

18. The vehicle sensing system according to claim 7 wherein said electromagnetic sensor comprises a photo sensor.

19. The method of claim 8, wherein said period of time is determined by an electronic circuit.

20. The method of claim 13, wherein said electromagnetic sensor comprises a photo sensor.

* * * * *